United States Patent

Kagata et al.

[11] Patent Number: 5,824,616
[45] Date of Patent: Oct. 20, 1998

[54] DIELECTRIC CERAMIC COMPOSITIONS

[75] Inventors: Hiroshi Kagata; Junichi Kato; Keiji Nishimoto, all of Osaka, Japan

[73] Assignee: Matsushita Electric Industrial Co., Ltd., Osaka, Japan

[21] Appl. No.: 606,693

[22] Filed: Feb. 22, 1996

[30] Foreign Application Priority Data

Mar. 2, 1995 [JP] Japan ................................. 7-043292
Jul. 14, 1995 [JP] Japan ................................. 7-179123

[51] Int. Cl.$^6$ .................................................. C04B 35/46
[52] U.S. Cl. ........................................... 501/136; 501/139
[58] Field of Search ........................... 501/136, 139

[56] References Cited

U.S. PATENT DOCUMENTS

| | | | |
|---|---|---|---|
| 5,232,880 | 8/1993 | Wada et al. | 501/136 |
| 5,525,562 | 6/1996 | Kagata et al. | 501/135 |

FOREIGN PATENT DOCUMENTS

| | | | |
|---|---|---|---|
| 0 664 276 | 7/1995 | European Pat. Off. | |
| 51-30392 | 3/1976 | Japan . | |
| 51-30395 | 3/1976 | Japan . | |
| Sho 53-35454 | 4/1978 | Japan | H01P 7/00 |
| 59-149603 | 8/1984 | Japan . | |
| 63-112459 | 5/1988 | Japan | C04B 35/46 |
| 63-3237307 | 10/1988 | Japan | C04B 35/46 |
| 1192763 | 8/1989 | Japan | C04B 35/46 |
| 3088768 | 4/1991 | Japan | C04B 35/46 |
| 406092725 | 4/1994 | Japan | C04B 35/46 |
| 406092727 | 4/1994 | Japan | C04B 35/46 |

*Primary Examiner*—Deborah Jones
*Attorney, Agent, or Firm*—Merchant, Gould, Smith, Edell, Welter & Schmidt, P.A.

[57] ABSTRACT

The invention provides a dielectric ceramic composition represented by Formula 1:

$$(1-x)Re_{1+a}(A_{2/3}Nb_{1/3})O_{3+1.5a} - xB_{1+b}TiO_{3+b} \quad \text{Formula 1}$$

wherein Re represents a component comprising a rare earth element, A represents a component comprising at least one element selected from the group consisting of Mg and Zn, B represents a component comprising Ca, x represents a number in the range of 0.40 to 0.80, a represents a number in the range of 0 to 0.15, and b represents a number in the range of 0 to 0.08. The composition has a high relative permittivity, a Q value and a small resonant frequency temperature coefficient. The composition is useful in miniaturizing dielectric resonators.

20 Claims, No Drawings

DIELECTRIC CERAMIC COMPOSITIONS

FIELD OF THE INVENTION

The invention relates to dielectric ceramic compositions for use in a variety of filters, resonators, or the like. Specifically, the invention relates to dielectric ceramic compositions for use in the microwave region.

BACKGROUND OF THE INVENTION

Communications using electromagnetic waves in the microwave region have progressed lately in connection with car telephones, portable telephones and satellite broadcasting. The progress in the communications requires miniaturization of related equipment. To satisfy this requirement, miniaturized components for such equipment are needed. Such equipment uses dielectric material. Specifically, dielectric material is incorporated in filters or oscillators in the equipment as a dielectric resonator. The size of dielectric resonators using the identical resonant mode is in inverse proportion to the square root of a relative permittivity ($\epsilon_r$) which the dielectric material possesses. Production of miniaturized dielectric resonators requires materials having a high relative permittivity. Practical dielectric resonators further entail the following properties: the dielectric loss of the ceramics is low in the microwave region, that is, the Q value of the ceramics is high; and the temperature coefficient ($\tau_f$) of the ceramics with respect to the resonant frequency (i.e. the effect of temperature on the resonant frequency of the ceramic) is small. The Q value refers to a reciprocal of the dielectric loss represented by tan $\delta$.

As a microwave dielectric for dielectric resonators, a number of ceramic perovskites containing barium (Ba), such as $Ba(Zn_{1/3}Ta_{2/3})O_3$, have been proposed in Japanese Examined Patent (KOKOKU) Publication No. SHO59(1984)-48484. The proposed dielectric had a very high Q value. The sintering temperatures were generally from 1400° C. to 1500° C. However, the proposed dielectric compositions had a low relative permittivity of approximately 30. Such compositions were less practical to miniaturize dielectric resonators satisfactorily. Therefore, dielectric ceramics having a high relative permittivity, high Q value and a small resonant frequency temperature coefficient were desired.

SUMMARY OF THE INVENTION

To solve the above problems, the invention aims to provide dielectric ceramic compositions having a high relative permittivity, high Q value and a small resonant frequency temperature coefficient for producing dielectric ceramic for use in the microwave region. The compositions are further required to sinter at relatively low temperatures.

The invention provides a dielectric ceramic composition represented by Formula 1:

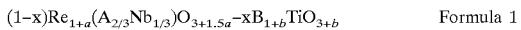  Formula 1 wherein the letters Re represents at least one component comprising at least one rare earth element, the letter A represents at least one component comprising at least one element selected from the group consisting of magnesium (Mg) and zinc (Zn), the letter B represents at least one component comprising at least calcium (Ca), the letter x represents a number in the range of 0.40 to 0.80, the letter a represents a number in the range of 0 to 0.15, and the letter b represents a number in the range of 0 to 0.08. The rare earth elements include scandium (Sc), yttrium (Y) and 15 lanthanoids, which all belong to the III A group in the periodic table. The symbol Nb in Formula 1, needless to say, represents niobium, the symbol O represents oxygen, and the symbol Ti represents titanium. The component represented by B in Formula 1 can comprise barium (Ba), strontium (Sr) and lead (Pb), either alone or in combination. The component represented by B in Formula 1 preferably comprises Ca in an amount of at least 70%.

It is preferable in the dielectric ceramic composition that the component represented by A in Formula 1 represents Mg, and the composition is represented by Formula 2:

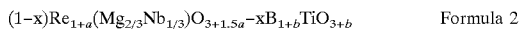  Formula 2 wherein Re represents at least one component comprising at least one element selected from the group consisting of Y, lanthanum (La), neodymium (Nd) and samarium (Sm), B represents at least one element comprising at least Ca, x represents a number in the range of 0.40 to 0.80, a represents a number in the range of 0 to 0.15, and b represents a number in the range of 0 to 0.08.

It is preferable in the dielectric ceramic composition that Re in Formula 2 represents Y, B represents Ca, and the composition is represented by Formula 3:

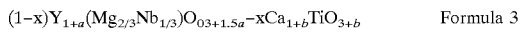  Formula 3 wherein x represents a number in the range of 0.45 to 0.73.

It is preferable in the dielectric ceramic composition that Re in Formula 2 represents La, B represents Ca, and the composition is represented by Formula 4:

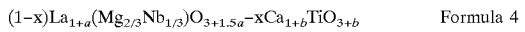  Formula 4 wherein x represents a number in the range of 0.50 to 0.75.

It is preferable in the dielectric ceramic composition that Re in Formula 2 represents Nd, B represents Ca, and the composition is represented by Formula 5:

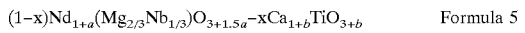  Formula 5 wherein x represents a number in the range of 0.45 to 0.77.

It is preferable in the dielectric ceramic composition that Re in Formula 2 represents Sm, B represents Ca, and the composition is represented by Formula 6:

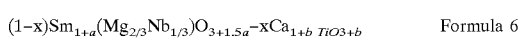  Formula 6 wherein x represents a number in the range of 0.47 to 0.72.

It is preferable in the dielectric ceramic composition that the component represented by A in Formula 1 comprises cobalt (Co) in an amount of at most 30%.

It is preferable in the dielectric ceramic composition that the component represented by A in Formula 1 comprises copper (Cu) in an amount of at most 10%.

It is preferable that 100 weight parts of the dielectric ceramic composition further comprises more than 0 weight part but at most 0.8 weight part of Cu in terms of copper(II) oxide (CuO).

It is preferable that 100 weight parts of the dielectric ceramic composition further comprises more than 0 weight part but at most 0.8 weight part of manganese (Mn) in terms of manganese(IV) oxide ($MnO_2$).

It is preferable in the dielectric ceramic composition that, in the component represented by ($A_{2/3}Nb_{1/3}$) in Formula 1, more than 0% but at most 50% is replaced with alminum (Al).

The dielectric ceramic composition represented by Formula 1 provides a dielectric ceramic composition having a higher relative permittivity, higher Q value, and a smaller resonant frequency temperature coefficient.

The dielectric ceramic composition represented by Formula 2 provides a dielectric ceramic composition having a higher relative permittivity, higher Q value, and a smaller resonant frequency temperature coefficient.

The dielectric ceramic composition represented by Formula 3 provides a dielectric ceramic composition having a higher relative permittivity, higher Q value, and a smaller resonant frequency temperature coefficient.

The dielectric ceramic composition represented by Formula 4 provides a dielectric ceramic composition having a higher relative permittivity, higher Q value, and a smaller resonant frequency temperature coefficient.

The dielectric ceramic composition represented by Formula 5 provides a dielectric ceramic composition having a higher relative permittivity, higher Q value, and a smaller resonant frequency temperature coefficient.

The dielectric ceramic composition represented by Formula 6 provides a dielectric ceramic composition having a higher relative permittivity, higher Q value, and a smaller resonant frequency temperature coefficient.

DETAILED DESCRIPTION OF THE PREFERRED EMBODIMENTS

The invention is detailed with reference to the following Examples 1, 2 and 3, and Tables 1–5.

Example 1

We used as starting materials chemically pure materials of $Y_2O_3$, $Nd_2O_3$, $Sm_2O_3$, $La_2O_3$, $Dy_2O_3$, $CeO_2$, $Pr_6O_{11}$, $Gd_2O_3$, $Ho_2O_3$, $Yb_2O_3$, MgO, NiO, $Nb_2O_5$, $CaCO_3$, $SrCO_3$, $BaCO_3$, PbO or $TiO_2$. After checking the purity of the materials, we weighed and mixed the materials for the compositions indicated by the components referred to as Re, A and B, and the ratios referred to as x, a and b in Table 1.

Each powdery material was mixed in a polyethylene ball mill for 17 hours together with 5 mm-diameter stabilized zirconia balls and pure water. The resulting slurry was dried and calcined in an alumina pot at a certain temperature selected from 1000° C. to 1200° C. for 4 hours. For the certain temperature, we selected temperatures at which the most preferred calcined substances were formed. The calcined substance was crushed by the ball mill for 17 hours and dried to form a powdery material. The powdery material was mixed with 6 weight parts of a 5 wt % poly(vinyl alcohol) aqueous solution as a binder. The mixture was granulated through a 32-mesh screen, and the mixture was pressed under 100 MPa to a column with a diameter of 13 mm and a thickness of 5 mm. The column was heated at 650° C. for 2 hours to burn up the binder. The column in a covered magnesia porcelain container was fired at a certain temperature selected from 1250° C. to 1500° C. for 2 hours. The sintered body having the highest density of about 6 $g/cm_3$ was used to examine dielectric properties at a microwave. The resonant frequencies and the Q values were determined in the dielectric resonator method. The permittivities were calculated, based on the size of the sintered body and the resonant frequency. The resonant frequencies were 2 GHz to 5 GHz. A resonant frequency at −25° C., 20° C. or 85° C. was measured, and the corresponding temperature coefficient ($\tau_f$) was calculated using the method of least squares. Tables 1, 2 and 3 show the composition for all examples also show the results of sintering. For all compositions shown in Tables 2 and 3, the component represented by B in Formula 1 is Ca. Examples marked with # are comparative examples. The Q value depends on the resonant frequency, and consequently, the Q value was evaluated by the product of a Q value multiplied by the resonant frequency (f). In Tables 1–5, the product of a Q value multiplied by the resonant frequency (f) is referred to as Qf, the relative permittivity is referred to as $\epsilon_r$, and the temperature coefficient is referred to as $\tau_f$.

TABLE 1

| | | Composition | | | | | | Qf | $\tau_f$ |
|---|---|---|---|---|---|---|---|---|---|
| No. | Re | A | B | x | a | b | $\epsilon_r$ | (GHz) | (ppm/°C.) |
| 1 | 0.8Nd—0.2Ce | Mg | Ca | 0.6 | 0.0 | 0.0 | 41 | 30000 | −25 |
| 2 | 0.8Nd—0.2Pr | Mg | Ca | 0.6 | 0.0 | 0.0 | 41 | 29000 | −24 |
| 3 | 0.8Nd—0.2Gd | Mg | Ca | 0.6 | 0.0 | 0.0 | 37 | 29000 | −22 |
| 4 | 0.8Nd—0.2Ho | Mg | Ca | 0.6 | 0.0 | 0.0 | 37 | 26000 | −21 |
| 5 | 0.8Nd—0.2Yb | Mg | Ca | 0.6 | 0.0 | 0.0 | 36 | 24000 | −21 |
| 6 | 0.8Nd—0.2Er | Mg | Ca | 0.6 | 0.0 | 0.0 | 37 | 21000 | −23 |
| 7 | 0.5Nd—0.5Sm | Mg | Ca | 0.6 | 0.0 | 0.0 | 36 | 22000 | −20 |
| 8 | 0.5La—0.5Y | Mg | Ca | 0.6 | 0.0 | 0.0 | 40 | 21000 | −17 |
| 9# | 0.5La—0.5Y | Mg | Ca | 0.35 | 0.0 | 0.0 | 26 | 26000 | −72 |
| 10 | 0.5La—0.5Y | Mg | Ca | 0.4 | 0.0 | 0.0 | 30 | 25000 | −69 |
| 11 | 0.5La—0.5Y | Mg | Ca | 0.8 | 0.0 | 0.0 | 56 | 16000 | +68 |
| 12# | 0.5La—0.5Y | Mg | Ca | 0.85 | 0.0 | 0.0 | 62 | 14000 | +82 |
| 13 | 0.9La—0.1Ce | 0.5Mg—0.5Zn | Ca | 0.6 | 0.0 | 0.0 | 44 | 22000 | −21 |
| 14 | 0.9La—0.1Ce | Zn | Ca | 0.6 | 0.0 | 0.0 | 46 | 20000 | −20 |
| 15 | 0.9La—0.1Ce | 0.9Mg—0.1Ni | Ca | 0.6 | 0.0 | 0.0 | 42 | 23000 | −25 |
| 16 | Nd | Mg | 0.9Ca—0.1Ba | 0.6 | 0.0 | 0.0 | 42 | 28000 | −21 |
| 17 | Nd | Mg | 0.9Ca—0.1Sr | 0.6 | 0.0 | 0.0 | 41 | 32000 | −22 |
| 18 | Nd | Mg | 0.9Ca—0.1Pb | 0.6 | 0.0 | 0.0 | 43 | 27000 | −17 |
| 19 | 0.8Nd—0.2La | Mg | Ca | 0.6 | 0.1 | 0.0 | 40 | 37000 | −24 |
| 20 | 0.8Nd—0.2La | Mg | Ca | 0.6 | 0.15 | 0.0 | 39 | 34000 | −22 |
| 21# | 0.8Nd—0.2La | Mg | Ca | 0.6 | 0.2 | 0.0 | | Not sintering | |
| 22 | 0.8Nd—0.2La | Mg | Ca | 0.6 | 0.1 | 0.05 | 39 | 38000 | −23 |
| 23# | 0.8Nd—0.2La | Mg | Ca | 0.6 | 0.0 | 0.1 | | Not sintering | |
| 24 | 0.8Nd—0.2La—0.1Pr | Mg | Ca | 0.6 | 0.0 | 0.0 | 42 | 25000 | −21 |

Examples marked with # are comparative examples.

TABLE 2

| No. | Re | x | a | b | $\epsilon_r$ | Qf (GHz) | $\tau_f$ (ppm/°C.) |
|---|---|---|---|---|---|---|---|
| 1 | Y | 0.43 | 0.0 | 0.0 | 28 | 22000 | −55 |
| 2 | Y | 0.45 | 0.0 | 0.0 | 29 | 21000 | −49 |
| 3 | Y | 0.6 | 0.0 | 0.0 | 36 | 19000 | −9 |
| 4 | Y | 0.6 | 0.05 | 0.0 | 35 | 21000 | −10 |
| 5 | Y | 0.6 | 0.1 | 0.0 | 35 | 23000 | −12 |
| 6 | Y | 0.6 | 0.15 | 0.0 | 34 | 19000 | −13 |
| 7# | Y | 0.6 | 0.2 | 0.0 | | Not sintering | |
| 8 | Y | 0.6 | 0.0 | 0.03 | 35 | 22000 | −10 |
| 9 | Y | 0.6 | 0.1 | 0.05 | 35 | 24000 | −12 |
| 10 | Y | 0.6 | 0.0 | 0.08 | 34 | 19000 | −13 |
| 11# | Y | 0.6 | 0.0 | 0.10 | | Not sintering | |
| 12 | Y | 0.62 | 0.0 | 0.0 | 37 | 18000 | −2 |
| 13 | Y | 0.7 | 0.0 | 0.0 | 44 | 17000 | +38 |
| 14 | Y | 0.7 | 0.05 | 0.05 | 43 | 21000 | +39 |
| 15 | Y | 0.73 | 0.0 | 0.0 | 46 | 16000 | +49 |
| 16 | Y | 0.75 | 0.0 | 0.0 | 48 | 14000 | +60 |
| 17 | La | 0.47 | 0.0 | 0.0 | 35 | 24000 | −54 |
| 18 | La | 0.5 | 0.0 | 0.0 | 37 | 23000 | −50 |
| 19 | La | 0.6 | 0.0 | 0.0 | 43 | 24000 | −24 |
| 20 | La | 0.6 | 0.1 | 0.0 | 42 | 28000 | −26 |
| 21 | La | 0.6 | 0.15 | 0.0 | 41 | 23000 | −27 |
| 22# | La | 0.6 | 0.2 | 0.0 | | Not sintering | |
| 23 | La | 0.6 | 0.1 | 0.05 | 42 | 28000 | −27 |
| 24 | La | 0.6 | 0.0 | 0.1 | | Not sintering | |
| 25 | La | 0.65 | 0.0 | 0.0 | 47 | 22000 | −4 |
| 26 | La | 0.7 | 0.05 | 0.05 | 52 | 24000 | +23 |
| 27 | La | 0.75 | 0.0 | 0.0 | 57 | 20000 | +50 |
| 28 | La | 0.78 | 0.0 | 0.0 | 61 | 19000 | +66 |

Examples marked with # are comparative examples.

TABLE 3

| No. | Re | x | a | b | $\epsilon_r$ | Qf (GHz) | $\tau_f$ (ppm/°C.) |
|---|---|---|---|---|---|---|---|
| 29 | Nd | 0.42 | 0.0 | 0.0 | 29 | 42000 | −54 |
| 30 | Nd | 0.45 | 0.0 | 0.0 | 32 | 40000 | −49 |
| 31 | Nd | 0.6 | 0.0 | 0.0 | 39 | 34000 | −24 |
| 32 | Nd | 0.6 | 0.1 | 0.0 | 38 | 37000 | −26 |
| 33 | Nd | 0.6 | 0.15 | 0.0 | 37 | 32000 | −27 |
| 34# | Nd | 0.6 | 0.2 | 0.0 | | Not sintering | |
| 35 | Nd | 0.6 | 0.1 | 0.05 | 38 | 38000 | −27 |
| 36# | Nd | 0.6 | 0.0 | 0.1 | | Not sintering | |
| 37 | Nd | 0.65 | 0.05 | 0.0 | 43 | 32000 | −5 |
| 38 | Nd | 0.72 | 0.0 | 0.05 | 51 | 26000 | +27 |
| 39 | Nd | 0.77 | 0.0 | 0.0 | 59 | 22000 | +50 |
| 40 | Nd | 0.8 | 0.0 | 0.0 | 62 | 20000 | +66 |
| 41 | Sm | 0.44 | 0.0 | 0.0 | 26 | 20000 | −54 |
| 42 | Sm | 0.47 | 0.0 | 0.0 | 28 | 20000 | −50 |
| 43 | Sm | 0.6 | 0.0 | 0.0 | 34 | 18000 | −13 |
| 44 | Sm | 0.6 | 0.1 | 0.0 | 33 | 22000 | −14 |
| 45 | Sm | 0.6 | 0.15 | 0.0 | 33 | 17000 | −16 |
| 46# | Sm | 0.6 | 0.2 | 0.0 | | Not sintering | |
| 47 | Sm | 0.6 | 0.1 | 0.05 | 33 | 23000 | −15 |
| 48# | Sm | 0.6 | 0.0 | 0.1 | | Not sintering | |
| 49 | Sm | 0.65 | 0.0 | 0.0 | 38 | 17000 | +5 |
| 50 | Sm | 0.68 | 0.05 | 0.05 | 41 | 18000 | +26 |
| 51 | Sm | 0.72 | 0.0 | 0.0 | 43 | 16000 | +50 |
| 52 | Sm | 0.75 | 0.0 | 0.0 | 46 | 14000 | +58 |

Examples marked with # are comparative examples.

Tables 1 to 3 show that the composition represented by Formula 1 or 2 provides excellent microwave dielectric properties such as a temperature coefficient ($\tau_f$) of −70 ppm/° C. to +70 ppm/° C., a relative permittivity more than 20 and a product of the Q value multiplied by the resonant frequency (f) of more than 15000 GHz. Specifically, Table 2 shows that the composition represented by Formula 3, 4, 5 or 6 provides excellent microwave dielectric properties such as a temperature coefficient ($\tau_f$) of −50 ppm/° C. to +50 ppm/° C., a relative permittivity more than 20 and a product of the Q value multiplied by the resonant frequency (f) of more than 15000 GHz. When the composition is represented by Formula 3, the ratio represented by x in the range of 0.45 to 0.73 provided a particularly excellent dielectric property. When the composition is represented by Formula 4, the ratio represented by x in the range of 0.50 to 0.75 provided a particularly excellent dielectric property. When the composition is represented by Formula 5, the ratio represented by x in the range of 0.45 to 0.77 provided a particularly excellent dielectric property. When the composition is represented by Formula 6, the ratio represented by x in the range of 0.47 to 0.72 provided a particularly excellent dielectric property. It was also confirmed that an appropriate ratio represented by x provided a temperature coefficient ($\tau_f$) of almost 0 ppm/° C. while the relative permittivity was more than 40, and the Q value was kept high. When the ratio represented by x deviated from the limitation indicated by Formulas 1 to 6, the temperature coefficient ($\tau_f$) was outside the above range. Such cases were considered less practical. When the ratio represented by a or b deviated from the limitation indicated by Formula 1, no dense sintered bodies were formed. Some compositions in the Comparative Examples did not sinter.

EXAMPLE 2

The production and the evaluation of compositions were conducted in the same manner as in Example 1. In addition to the materials disclosed in Example 1, we used as a starting material $Co_3O_4$, CuO or $MnO_2$. In all of the examined compositions, the composition represented by Formula 1 was kept constant and the component referred to as B was Ca, the ratio represented by x was 0.6, the ratio represented by a was 0.0, and the ratio represented by b was 0.0. For example, in Example No. 13 in Table 4, we first weighed and mixed $Nd_2O_3$ (0.4 molar part), MgO (0.822 molar part), $Nb_2O_5$ (0.133 molar part) and $TiO_2$ (0.6 molar part). Then, we added 0.1 weight part of CuO to 100 weight parts of the mixture to complete the composition indicated by Example No. 13 in Table 4. Table 4 shows the composition for all examples and also show the results of sintering.

TABLE 4

| No. | Re | A | Additive (wt %) | $\epsilon_r$ | Qf (GHz) | $\tau_f$ (ppm/°C.) |
|---|---|---|---|---|---|---|
| 1 | Y | Mg | — | 36 | 19000 | −9 |
| 2 | Y | 0.9Mg-0.1Co | — | 37 | 23000 | −9 |
| 3 | 0.5Y-0.5La | 0.9Mg-0.1Co | — | 40 | 27000 | −17 |
| 4 | 0.5Nd-0.5Sm | 0.9Mg-0.1Co | — | 37 | 26000 | −15 |
| 5 | Y | 0.7Mg-0.3Co | — | 37 | 20000 | −10 |
| 6# | Y | 0.6Mg-0.4Co | — | 38 | 12000 | −11 |
| 7 | La | Mg | — | 43 | 24000 | −24 |
| 8 | La | 0.97Mg-0.03Cu | — | 44 | 28000 | −25 |
| 9 | La | 0.8Mg-0.17Zn-0.03Cu | — | 46 | 27000 | −22 |
| 10 | La | 0.9Mg-0.1Cu | — | 44 | 24000 | −25 |
| 11# | La | 0.85Mg-0.15Cu | — | 45 | 11000 | −27 |
| 12 | Nd | Mg | — | 39 | 34000 | −24 |
| 13 | Nd | Mg | CuO: 0.1 | 40 | 37000 | −23 |
| 14 | 0.9La-0.1Pr | Mg | CuO: 0.1 | 42 | 28000 | −23 |
| 15 | Nd | 0.5Mg-0.5Zn | CuO: 0.4 | 42 | 38000 | −21 |
| 16 | Nd | Mg | CuO: 0.8 | 40 | 35000 | −24 |

TABLE 4-continued

| | Composition | | | | |
|---|---|---|---|---|---|
| No. | Re | A | Additive (wt %) | $\epsilon_r$ | Qf (GHz) | $\tau_f$ (ppm/°C.) |
| 17# | Nd | Mg | CuO: 1.0 | 41 | 2000 | −26 |
| 18 | Sm | Mg | — | 34 | 18000 | −13 |
| 19 | Sm | Mg | $MnO_2$: 0.2 | 34 | 24000 | −12 |
| 20 | Sm | Mg | $MnO_2$: 0.3 | 34 | 23000 | −13 |
| 21 | Sm | Mg | $MnO_2$: 0.4 | 35 | 21000 | −14 |
| 22 | Sm | Mg | $MnO_2$: 0.8 | 35 | 19000 | −13 |
| 23# | Sm | Mg | $MnO_2$: 1.0 | 34 | 10000 | −12 |

Examples marked with # are comparative examples.

Table 4 shows that the product of the Q value multiplied by the resonant frequency (f) was increased by adding Co or Cu to the component referred to as A in Formula 1, or adding $MnO_2$ or CuO to the composition. However, the addition of Co as more than 30% of the component referred to as A in Formula 1 provided a product of the Q value multiplied by the resonant frequency (f) of under 15000 GHz. The addition of Cu as more than 10% of the component referred to as A in Formula 1 similarly provided a product of the Q value multiplied by the resonant frequency (f) of under 15000 GHz. The addition of $MnO_2$ as more than 0.8 weight part of the composition represented by Formula 1 similarly provided a product of the Q value multiplied by the resonant frequency (f) of under 15000 GHz. The addition of CuO as more than 0.8 weight part of the composition represented by Formula 1 similarly provided a product of the Q value multiplied by the resonant frequency (f) of under 15000 GHz. The compositions providing a product of the Q value multiplied by the resonant frequency (f) of under 15000 GHz were considered less practical.

EXAMPLE 3

The compositions represented by the formula $0.4Re_{1.0}\{(Mg_{2/3}Nb_{1/3})_{1-y}Al_y\}O_3$–$0.6CaTiO_3$ were similarly examined by changing the component referred to as Re and the ratio referred to as y in the formula. We used $Al_2O_3$ as a starting material for Al. Table 5 shows the composition for all examples and also shows the results of sintering.

TABLE 5

| | Composition | | | Qf | $\tau_f$ |
|---|---|---|---|---|---|
| No. | Re | y | $\epsilon_r$ | (GHz) | (ppm/°C.) |
| 1 | Y | 0.0 | 36 | 19000 | −9 |
| 2 | Y | 0.2 | 35 | 23000 | −7 |
| 3 | Y | 0.5 | 34 | 21000 | −5 |
| 4# | Y | 0.6 | 30 | 14000 | −4 |
| 5 | La | 0.2 | 42 | 30000 | −22 |
| 6 | Nd | 0.4 | 36 | 37000 | −20 |
| 7 | 0.9La-0.1Pr | 0.2 | 41 | 29000 | −21 |
| 8 | Sm | 0.2 | 33 | 22000 | −11 |
| 9 | Sm | 0.5 | 32 | 18000 | −10 |
| 10# | Sm | 0.6 | 31 | 11000 | −9 |

Examples marked with # are comparative examples.

Table 5 shows that the addition of Al increases the product of the Q value multiplied by the resonant frequency (f). When the content of Al exceeded 0.5, the product of the Q value multiplied by the resonant frequency (f) was under 15000 GHz.

As explained above, the compositions of the invention realize a high Q value and a small temperature coefficient at a relative permittivity of 40 or more. Therefore, the compositions are helpful in miniaturizing dielectric resonators. In addition to dielectric resonators, the dielectric compositions are applicable to circuit substrates for high frequencies or ceramic layered capacitors. The compositions are valuable for industry. The invention provides the dielectric ceramic compositions having a high relative permittivity and a high Q value and satisfying a small temperature coefficient on a resonant frequency. The compositions are sintered at relatively low temperatures.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. A dielectric ceramic composition comprising a component represented by Formula 1:

$$(1-x)Re_{1+a}(A_{2/3}Nb_{1/3})O_{3+1.5a} - xB_{1+b}TiO_{3+b} \qquad \text{Formula 1}$$

wherein Re represents a component comprising a rare earth element, A represents a component comprising at least one element selected from the group consisting of Mg and Zn, B represents a component comprising Ca, x represents a number in the range of 0.40 to 0.80, a represents a number in the range of 0 to 0.15, and b represents a number in the range of 0 to 0.08.

2. The dielectric ceramic composition according to claim 1, wherein A in Formula 1 represents Mg, and the composition is represented by Formula 2:

$$(1-x)Re_{1+a}(Mg_{2/3}Nb_{1/3})O_{3+1.5a} - xB_{1+b}TiO_{3+b} \qquad \text{Formula 2}$$

wherein Re represents a component comprising at least one element selected from the group consisting of Y, La, Nd and Sm, B represents a component comprising Ca, x represents a number in the range of 0.40 to 0.80, a represents a number in the range of 0 to 0.15, and b represents a number in the range of 0 to 0.08.

3. The dielectric ceramic composition according to claim 2, wherein Re in Formula 2 represents Y, B represents Ca, and the composition is represented by Formula 3:

$$(1-x)Y_{1+a}(Mg_{2/3}Nb_{1/3})O_{3+1.5a} - xCa_{1+b}TiO_{3+b} \qquad \text{Formula 3}$$

wherein x represents a number in the range of 0.45 to 0.73.

4. The dielectric ceramic composition according to claim 2, wherein Re in Formula 2 represents La, B represents Ca, and the composition is represented by Formula 4:

$$(1-x)La_{1+a}(Mg_{2/3}Nb_{1/3})O_{3+1.5a} - xCa_{1+b}TiO_{3+b} \qquad \text{Formula 4}$$

wherein x represents a number in the range of 0.50 to 0.75.

5. The dielectric ceramic composition according to claim 2, wherein Re in Formula 2 represents Nd, B represents Ca, and the composition is represented by Formula 5:

$$(1-x)Nd_{1+a}(Mg_{2/3}Nb_{1/3})O_{3+1.5a} - xCa_{1+b}TiO_{3+b} \qquad \text{Formula 5}$$

wherein x represents a number in the range of 0.45 to 0.77.

6. The dielectric ceramic composition according to claim 2, wherein Re in Formula 2 represents Sm, B represents Ca, and the composition is represented by Formula 6:

$$(1-x)Sm_{1+a}(Mg_{2/3}Nb_{1/3})O_{3+1.5a} - xCa_{1+b}TiO_{3+b} \quad \text{Formula 6}$$

wherein x represents a number in the range of 0.47 to 0.72.

7. The dielectric ceramic composition according to claim 1, wherein the component represented by A in Formula 1 comprises Co in an amount of at most 30%.

8. The dielectric ceramic composition according to claim 1, wherein the component represented by A in Formula 1 comprises Cu in an amount of at most 10%.

9. The dielectric ceramic composition according to claim 1, wherein more than 0% but at most 50% of the component represented by $(A_{2/3}Nb_{1/3})$ in Formula I is replaced with Al.

10. In a communications device using electromagnetic waves in the microwave region, and which comprises a dielectric ceramic composition, the improvement wherein the dielectric ceramic composition is a dielectric ceramic composition in accordance with claim 1.

11. The communications device according to claim 10, wherein the dielectric ceramic composition is incorporated in a filter in the device.

12. The communications device according to claim 10, wherein the dielectric ceramic composition is incorporated in an oscillator in the device.

13. A dielectric ceramic composition comprising 100 parts by weight of a component represented by Formula I:

$$(1-x)\ Re_{1+a}(A_{2/3}Nb_{1/3})O_{3+1.5a} - xB_{1+b}TiO_{3+b} \quad \text{Formula I}$$

wherein Re represents a component comprising a rare earth element, A represents a component comprising at least one element selected from the group consisting of Mg and Zn, B represents a component comprising Ca, x represents a number in the range of 0.40 to 0.80, a represents a number in the range of 0 to 0.15, and b represents a number in the range of 0 to 0.08, and more than 0 but at most 0.8 parts by weight of Cu in terms of CuO.

14. In a communication device using electromagnetic waves in the microwave region, and which comprises a dielectric ceramic composition, the improvement wherein the dielectric ceramic composition is a dielectric ceramic composition in accordance with claim 13.

15. The communications device according to claim 14, wherein the dielectric ceramic composition is incorporated in a filter in the device.

16. The communications device according to claim 14, wherein the dielectric ceramic composition is incorporated in an oscillator in the device.

17. A dielectric ceramic composition comprising 100 parts by weight of a component represented by Formula I:

$$(1-x)\ Re_{1+a}(A_{2/3}Nb_{1/3})O_{3+1.5a} - xB_{1+b}TiO_{3+b} \quad \text{Formula I}$$

wherein Re represents a component comprising a rare earth element, A represents a component comprising at least one element selected from the group consisting of Mg and Zn, B represents a component comprising Ca, x represents a number in the range of 0.40 to 0.80, a represents a number in the range of 0 to 0.15, and b represents a number in the range of 0 to 0.08, and more than 0 but at most 0.8 parts by weight of Mn in terms of $MnO_2$.

18. In a communication device using electromagnetic waves in the microwave region, and which comprises a dielectric ceramic composition, the improvement wherein the dielectric ceramic composition is a dielectric ceramic composition in accordance with claim 17.

19. The communications device according to claim 18, wherein the dielectric ceramic composition is incorporated in a filter in the device.

20. The communications device according to claim 18, wherein the dielectric ceramic composition is incorporated in an oscillator in the device.

* * * * *